United States Patent Office 3,312,745
Patented Apr. 4, 1967

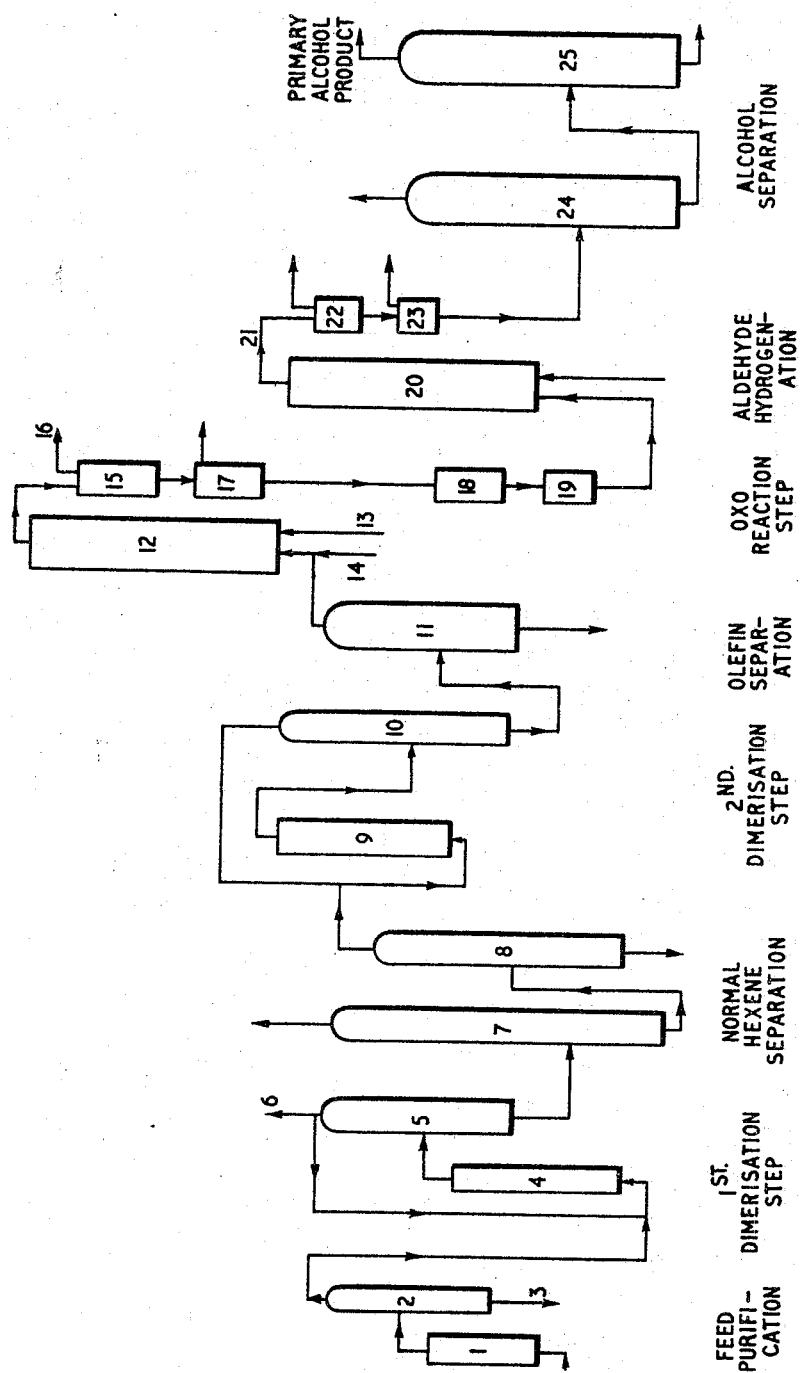

3,312,745
PROCESS FOR THE PRODUCTION OF PRIMARY ALCOHOLS
John Habeshaw, Dollar, and Wilfred John Oldham, Falkirk, Scotland, assignors to British Hydrocarbon Chemical Limited, London, England, a British company
Filed Sept. 30, 1963, Ser. No. 312,610
Claims priority, application Great Britain, Oct. 16, 1962, 39,131/62
18 Claims. (Cl. 260—638)

The present invention relates to the production of primary alcohols for use in the manufacture of detergents.

The preparation of detergents by the sulphation of primary aliphatic alcohols (fatty alcohols) is well known. Hitherto the fatty alcohol sulphates have been made from primary alcohols, containing even-numbered unbranched carbon chains, derived from the naturally occurring fatty acids in which only such chains are present. These detergents have recently assumed increased importance since they are rapidly and completely biodegradable, in contrast to the conventional highly branched chain alkylbenzene sulphonate detergents derived from propylene tetramer. The conventional propylene tetramer may be converted to a tridecyl primary alcohol by the "oxo" reaction, but the sulphates derived from this alcohol are relatively resistant to biological attack.

We have now found that a two-stage polymerisation of propylene can be used to produce olefines which, although not predominantly straight chain, can be converted to primary aliphatic alcohols suitable for sulphation to give detergents readily metabolised by sewage organisms.

According to the present invention a process for the production of primary aliphatic alcohols comprises dimerising in a first dimerisation step propylene in the presence of a catalyst to form a product containing a substantial proportion of normal hexenes, separating from the product a fraction consisting substantially of normal hexenes, dimerising in a second dimerisation step the normal hexene fraction in the presence of a catalyst, reacting a fraction of the second dimerisation product containing the dimers of normal hexenes and within the $C_{10}$–$C_{16}$ range, but extending over a range of not more than five carbon numbers, with carbon monoxide and hydrogen in an oxo-synthesis reaction, hydrogenating the resulting aldehydes, and recovering the primary alcohol product.

The propylene used as feedstock to the process may be pure propylene or a fraction containing propylene, for example a $C_3$ fraction from catalytic cracking, from a steam cracking process, or from thermal cracking operation. Since the catalysts for the first dimerisation step are impaired by large amounts of acetylene or propadiene, it is preferred that when these are present the $C_3$ feedstock be pre-treated, for example by conventional hydrogenation processes, to remove most of these compounds prior to the first dimerisation step. Sulphur compounds, water, and carbon monoxide also adversely affect the performance of these catalysts. It is also preferred that the $C_3$ feedstock be free of higher boiling contaminants, particularly isobutene and branched hydrocarbons likely to form impurities in the dimerisation step which would be difficult to separate from the normal hexenes produced. Propane functions merely as a diluent in this step, and its presence can therefore be tolerated.

The catalysts used in the first dimerisation step are those which will give dimerisation products containing a substantial proportion of normal hexenes. It is preferred to use transition metal oxide catalysts since these give high yields of normal hexenes from propylene and produce only small amounts of branched-chain isomers which are difficult to separate. The preferred transition metal oxide catalyst is an oxide or oxides of nickel, cobalt, or chromium or mixtures thereof, and the use of nickel oxide catalysts is particularly preferred for this step. The catalysts may be supported on carriers such as silica, silica gel or a silica/alumina cracking catalyst. A silica/alumina support is preferred. The preparation of transition metal oxide catalysts of this type is described, for instance, by Holm et al. in Ind. Eng. Chem., 49, 250, 1957. These catalysts are activated by heating in air or oxygen at temperatures up to about 800° C., and periodic reactivation of the catalysts may be carried out similarly.

The first dimerisation step is suitably carried out at temperatures in the range of about 20 to 150° C. and preferably 40–80° C. desirably under sufficient pressure to maintain the reactants in the liquid phase. An inert solvent, liquid under the reaction conditions, such as a low ($C_5$) paraffin may be used if desired.

The dimerisation is preferably carried out with incomplete conversion of propylene for instance from 30–80%, in order to minimise the formation of propylene polymers higher than the dimer but where other uses for higher polymers exist their formation may be no disadvantage and high propylene conversions can be used.

The separation from the first dimerisation products of a fraction consisting substantially of normal hexenes may be carried out by known methods, using for instance molecular sieves, urea adduction or fractional distillation. Fractional distillation is the preferred method for carrying out this separation, which is critical in that no large amounts of branched-chain hydrocarbons must be allowed to pass with the normal hexenes to the second dimerisation step. The main branched-chain isomer formed in the first dimerisation step is 4-methyl-2-pentene, and the fractional distillation should be operated so as to separate this isomer substantially completely from the normal hexene fraction. Suitably the first dimerisation product is first distilled to separate unconverted propylene and propane (if any is present), which may be recycled to the dimerisation reactor; with feedstocks containing a high proportion of propane, withdrawal of a purge stream from the recycle propylene may be necessary to prevent build-up of propane in the system. After removal of unconverted propylene, the dimerisation product is then distilled to separate a distillate fraction consisting of methylpentenes, mainly 4-methyl-2-pentene, and the residue is further distilled to recover a normal hexene distillate fraction, which is mainly a mixture of hexene-2 and -3 with some hexene-1 leaving as residue trimers and higher polymers of propylene. The methylpentene fraction is a valuable by-product of the process, and may be converted, for instance, by double bond isomerisation into a product giving by cracking high yields of isoprene.

The normal hexene distillate fraction is then dimerised in a second dimerisation step. The reaction conditions in this step are broadly similar to those in the first dimerisation step but lower pressures are generally used. As in the first dimerisation step it is preferred to use transition metal oxide catalysts alone or supported on silica or preferably silica/alumina, but other catalysts may also be used, for instance Ziegler-type polymerisation catalysts, and synthetic petroleum cracking catalysts, especially silica/alumina. It is particularly preferred to use manganese oxide as catalyst in the second dimerisation step. To obtain the highest yields of the required dimers based on the normal hexenes fed it is advisable to operate the second dimerisation step at relatively low conversions. Temperatures in the range of about 20° to 150° C. are again preferred.

The olefinic product from the second dimerisation step is treated, preferably by fractional distillation, to separate a fraction containing the dimers of normal hexenes, and within the $C_{10}$ to $C_{16}$ carbon number range, but extending over a range of not more than 5, and preferably not more than 4, carbon numbers, for use in the oxo-synthesis reaction. Suitably the dimerisation product is first distilled to separate as distillate unpolymerised normal hexenes, which can be recycled to the second dimerisation step. The product is then fractionated, preferably under reduced pressure, to separate as distillate the required fraction containing the dimers of normal hexenes. This fraction consists primarily of dimers of normal hexenes and in a preferred embodiment the fractionation is carried out so as to separate substantially only dimers of normal hexenes as an overhead fraction. Generally under preferred conditions the product from the second dimerisation step contains little or no material other than $C_{12}$ olefines. However, in one embodiment of the invention the feed to the second dimerisation step includes, in addition to the normal hexene distillate fraction, straight chain mono-olefines in the carbon number range $C_5$ to $C_8$ produced by other means. Such a straight chain mono-olefine feed stock in the $C_5$-$C_8$ range may be obtained in any suitable manner, for instance as a fraction in the range $C_5$-$C_8$ of a thermally cracked high molecular weight paraffinic hydrocarbon, preferably after purification to remove sulphur compounds, diolefines, and acetylenic hydrocarbons; by polymerisation or copolymerisation of lower olefines, especially ethylene, and isolation of a straight chain fraction in the $C_5$ to $C_8$ range from the polymer; by dehydrogenation of normal paraffins in the $C_5$ to $C_8$ range and separation of the appropriate straight chain olefines; or by other known methods. The position of the double bond in the molecule is not critical, but the feedstock should not contain an appreciable proportion of branched chain olefines.

The recovered olefine fraction is reacted by known methods with carbon monoxide and hydrogen in an oxo-synthesis reaction to produce a mixture of oxo-aldehydes. Suitably the reaction is carried out by feeding the olefinic fraction to a high pressure reactor together with water gas and a cobalt catalyst, which is conveniently a cobalt compound soluble in the liquid olefine or volatile in the water gas stream, cobalt carbonyl or carbonyl hydride being examples. The reaction is carried out at a temperature of 100–200° C. (preferably 130–180° C.) and a pressure of about 100–300 atms.

The product from the reactor is cooled and unreacted water gas withdrawn, and the liquid product treated to decompose dissolved cobalt compounds to give insoluble material, which is then removed. During this treatment any dissolved carbon monoxide should also be removed from the liquid products.

The aldehyde product can be fractionated to recover unreacted olefins for recycle prior to hydrogenation, but this is difficult to do without causing considerable condensation of the main aldehyde product to high boiling by-products. It is therefore preferred to operate the oxo reaction step to a relatively high conversion, and to hydrogenate the total product; any unconverted olefine is thus largely converted to paraffin, which can be separated from the alcohols by fractionation. The hydrogenation may be carried out by conventional methods to convert the aldehydes present to alcohols, which are recovered from the total hydrogenated product by fractional distillation, preferably under reduced pressure.

A particular embodiment of the process of the present invention is illustratied with reference to the accompanying drawing in the form of a flow diagram.

A steam cracked $C_3$ fraction, containing approximately 95% of propylene, and small amounts of acetylene and propadiene is treated with the required amount of hydrogen in a selective hydrogenation reactor 1 to reduce the amount of acetylenes and propadiene present, since these reduce the life of the dimerisation catalyst used. The treated propylene passes (after cooling and drying) to the still 2 where a small amount of polymeric material is left as residue and withdrawn by line 3, treated polymer-free propylene passing overhead to the first dimerisation reactor 4. This reactor is charged with a nickel oxide on silica/alumina catalyst, and maintained at a temperature in the range 20–150° C., preferably 40–80° C. under sufficient pressure to maintain liquid phase conditions. Normally about 30–80% of the propylene is converted to dimer and higher polymers in this reactor although higher conversions can be used with some loss of dimer yield based on propylene reacted. The total reaction product is passed to the fractionator 5. In this unconverted propylene and the propane present is taken overhead and recycled to the dimerisation reactor 4. Propane is allowed to build-up in this recycle stream until sufficient propane and unconverted propylene is present in the total feed to the dimerisation reactor 4 to provide enough diluent to absorb the heat evolved in the dimerisation reaction as sensible heat of reactants plus diluent; any excess may be purged from the system by the line 6 as required to maintain the feed composition at the desired level. Other well known means can of course be used to control the temperature of the reaction if desired. The residue from fractionator 5 consisting of dimers and higher polymers of propylene is fed to the fractionator 7. In this the methylpentenes, predominantly 4-methylpentene-2, are removed as overhead distillate and the residue is passed to the still 8. This recovers a normal hexene distillate, which is mainly a mixture of hexene-2 and -3 with some hexene-1, and leaves as residue trimers and higher polymers of proplyene. The normal hexenes pass to the second dimerisation reactor 9, where they are contacted with a manganese oxide on silica/alumina or with silica/alumina catalyst to form dimers of the normal hexenes. The conversion in this step is kept relatively low to avoid forming high-boiling by-products, and the total products pass to the fractionator 10. This fractionator removes normal hexenes as distillate, which are returned to the reactor 9. The residue from fractionator 10, consisting of dimers of normal hexenes with a small amount of higher polymers is passed to the fractionator 11. This is operated under reduced pressure to produce a distillate olefine fraction consisting predominantly of dimers of normal hexenes and to discard a small residue of higher polymers. The olefine distillate is passed to the hydroformylation (oxo) reactor 12. A carbon monoxide-hydrogen mixture (suitably blue water gas) is fed to the reactor 12 by the line 13. The cobalt catalyst may be fed to the reactor as a solution of dicobalt octacarbonyl in the olefine feed by the line 14 (a solution of a cobalt salt such as cobalt naphthenate which is soluble in the hydrocarbon feed may also be used if desired), or alternatively cobalt carbonyl hydride may be generated by passing the water gas feed stream wholly or partly over cobalt metal under pressure at temperatures in the approximate range 20–200° C. All these methods of introducing cobalt catalysts are well known in the art. The liquid hydrocarbon feed is pumped up-flow through the reactor 12 concurrently with the water gas feed stream, the hydrocarbon being in the liquid phase, and suitable arrangements being made to remove the considerable exothermic heat of reaction and to keep the temperature within the preferred range of 130–180° C. Quite small amounts of cobalt catalyst are effective and the amount of cobalt (estimated as metal) required will generally be within the range 0.01 to 1% based on the olefine feed, 0.1% by weight being usually sufficient. The total reaction product (a mixture of unchanged olefine and main aldehyde product, with some paraffin, alcohol, and high boiling by-products) passes after cooling into the high pressure separator 15. Here the unreacted gas is removed by the line 16, and this high pressure gas may be recycled to the reactor 12. From the high pressure separator 15 the liquid product passes to the low pressure separator 17, where the pressure is reduced, any gas released from solution being vented. The liquid product containing only small amounts of carbon monoxide, and with cobalt compounds (mainly carbonyls) in solution is passed to the heater 18. Here the temperature is raised to about 100–200° C. this effectively decomposing the cobalt carbonyls in the liquid and converting them to insoluble cobalt or cobalt compounds, which are then removed in the filter 19, leaving a liquid product substantially free of cobalt compounds and carbon monoxide. Other means of removing cobalt compounds, for instance by pumping over an absorbent solid with hydrogen under pressure at about 100–150° C. may be used if desired. The liquid product passes to the hydrogenation reactor 20, where it is contacted with hydrogen in the presence of a catalyst active for hydrogenating aldehydes to alcohols; nickel on kieselguhr and supported copper catalysts are well known catalysts suitable for use in this step, which can be successfully effected under a wide range of conditions. Nickel or cobalt catalysts are particularly suitable for this operation. The completely hydrogenated product leaves the reactor by the line 21, unreacted hydrogen is removed in the high and low pressure separators 22 and 23 respectively, and the product is then fed to the fractionator 24, in which paraffin produced by hydrogenation of unreacted olefins or formed in the hydroformylation reactor 12 is re-residue, containing the required primary alcohol and any moved overhead, together with any other minor components boiling lower than the required alcohol. The high boiling by-products, is passed to the fractionator 25. This is operated under reduced pressure to produce the required primary alcohol product as an overhead distillate, which is withdrawn to storage. High boiling by-products are left as residue.

The olefinic products produced by the two stage dimerisation are particularly suitable feedstocks to the hydroformylation, in that they give high conversions much more readily than the very highly branched conventional propylene tetramer, and also produce products which, on sulphation, give active agents which are much more rapidly and completely biodegradable.

We claim:
1. The process for the production of primary aliphatic alcohols which comprises dimerising in a first dimerisation step propylene in the presence of a transition metal oxide catalyst at a temperature of from 20° C. to 150° C. to form a product containing a substantial proportion of normal hexenes, separating from the product a fraction consisting substantially of normal hexenes, dimerising in a second dimerisation step the normal hexene fraction in the presence of a catalyst which is a transition metal oxide, a synthetic petroleum cracking catalyst, or a Ziegler-type catalyst, reacting a fraction of the second dimerisation product containing the dimers of normal hexenes within the $C_{10}$ to $C_{16}$ carbon number range, but extending over a range of not more than 5 carbon numbers, with carbon monoxide and hydrogen at a temperature of from 100° C. to 200° C. and a pressure of from 100 to 300 atmospheres in an oxo-synthesis reaction, hydrogenating the resulting aldehydes, and recovering the primary alcohol product.

2. The process as claimed in claim 1 wherein the first dimerisation step is carried out in the presence of a catalyst selected from the group consisting of oxides of nickel and chromium and mixtures of these oxides.

3. The process as claimed in claim 1 wherein the first dimerisation step is carried out in the presence of a catalyst supported on a material selected from the group consisting of silica, silica gel and silica/alumina.

4. The process as claimed in claim 1 wherein the first dimerisation step is carried out at a temperature in the range of about 40 to 80° C.

5. The process as claimed in claim 1 wherein the per pass conversion of propylene in the first dimerisation step is within the range 30 to 80%.

6. The process as claimed in claim 1 wherein a fraction consisting substantially of normal hexenes is separated from the product of the first dimerisation step by fractional distillation.

7. The process as claimed in claim 1 wherein the second dimerisation step is carried out in the presence of a transition metal oxide catalyst.

8. The process as claimed in claim 1 wherein the second dimerisation step is carried out in the presence of a catalyst selected from the group consisting of oxides of nickel, cobalt, manganese and chromium, and mixtures of any of these oxides.

9. The process as claimed in claim 1 wherein the second dimerisation step is carried out in the presence of a catalyst supported on a material selected from the group consisting of silica, silica gel and silica/alumina.

10. The process as claimed in claim 1 wherein the second dimerisation step is carried out in the presence of a synthetic petroleum cracking catalyst.

11. The process as claimed in claim 10, wherein the catalyst is silica/alumina.

12. The process as claimed in claim 1 wherein the second dimerisation step is carried out at a temperature of 20 to 150° C.

13. The process as claimed in claim 1 wherein the per pass conversion of normal hexenes in the second dimerisation step is within the range 5 to 30%.

14. The process as claimed in claim 1 wherein a fraction in the $C_{10}$ to $C_{16}$ carbon number range is separated from the second dimerisation product by fractional distillation.

15. The process as claimed in claim 1 wherein the fraction in the $C_{10}$ to $C_{16}$ carbon number range separated from the second dimerisation product consists essentially of dimers of normal hexenes.

16. The process as claimed in claim 1 wherein the fraction in the $C_{10}$ to $C_{16}$ carbon number range separated from the second dimerisation product extends over a range of not more than 4 carbon numbers.

17. The process as claimed in claim 1 wherein the feed to the second dimerisation step includes in addition to the normal hexenes, other straight chain mono-olefines in the $C_5$ to $C_8$ carbon number range.

18. A process for the production of primary aliphatic alcohols which comprises dimerising in a first dimerisation step propylene in the presence of a catalyst selected from the group consisting of oxides of nickel, cobalt and chromium and mixtures thereof supported on a support selected from the group consisting of silica, silica gel and silica/alumina at a temperature of from 20° C. to 150° C. and at a per pass conversion of from 30 percent to 80 percent to form a product containing a substantial portion of normal hexenes, separating from the product a fraction consisting substantially of normal hexenes, dimerising in a second dimersing step the normal hexene fraction in the presence of a catalyst selected from the group consisting of (I) oxides of nickel, cobalt, manganese and chromium and mixtures thereof, supported on a support selected from the group consisting of silica, silica gel and silica/alumina, (II) synthetic petroleum cracking catalysts and (III) Ziegler-type catalysts at a temperature of from 20° C. to 150° C., reacting a fraction of the second dimerisation product containing the dimers of normal hexenes within the $C_{10}$ to $C_{16}$ carbon number range, but extending over a range of not more than 5 carbon numbers, with carbon monoxide and hydrogen at a temperature of from 100° C. to 200° C. and a pressure of from 100 to 300 atmospheres in an oxo-synthesis reaction, hydrogenating the resulting aldehydes, and recovering the primary alcohol product.

References Cited by the Examiner

UNITED STATES PATENTS

| | | | |
|---|---|---|---|
| 2,381,198 | 8/1945 | Bailey et al. | 260—683.15 |
| 2,482,877 | 9/1949 | Schmerling | 260—683.15 |
| 3,214,462 | 10/1965 | Swenson et al. | 260—683.15 |

FOREIGN PATENTS 933,700   8/1963   Great Britain.

LEON ZITVER, *Primary Examiner.*

J. E. EVANS, *Assistant Examiner.*

UNITED STATES PATENT OFFICE
CERTIFICATE OF CORRECTION

Patent No. 3,312,745　　　　　　　　　　　　　　　April 4, 1967

John Habeshaw et al.

It is hereby certified that error appears in the above numbered patent requiring correction and that the said Letters Patent should read as corrected below.

Column 5, line 42, beginning with "residue, containing" strike out all to and including "alcohol. The" in line 44, same column 5, and insert instead -- moved overhead, together with any other minor components boiling lower than the required alcohol. The residue, containing the required primary alcohol and any --; column 6, line 71 for "dimersing" read -- dimerisation --.

Signed and sealed this 7th day of November 1967.

(SEAL)
Attest:

Edward M. Fletcher, Jr.　　　　　　　　　　　　　EDWARD J. BRENNER
Attesting Officer　　　　　　　　　　　　　　　　Commissioner of Patents